United States Patent Office 2,713,895
Patented July 26, 1955

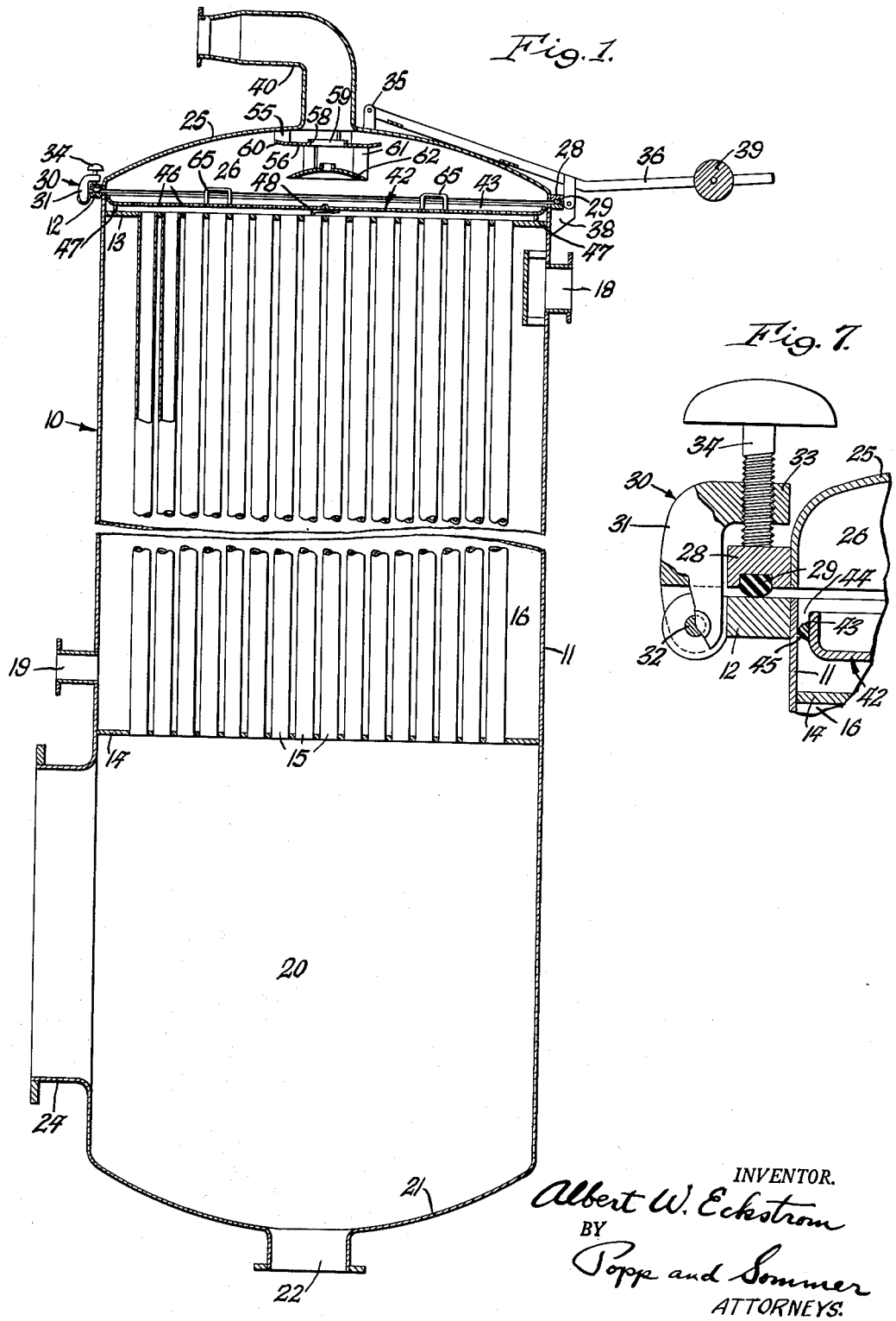

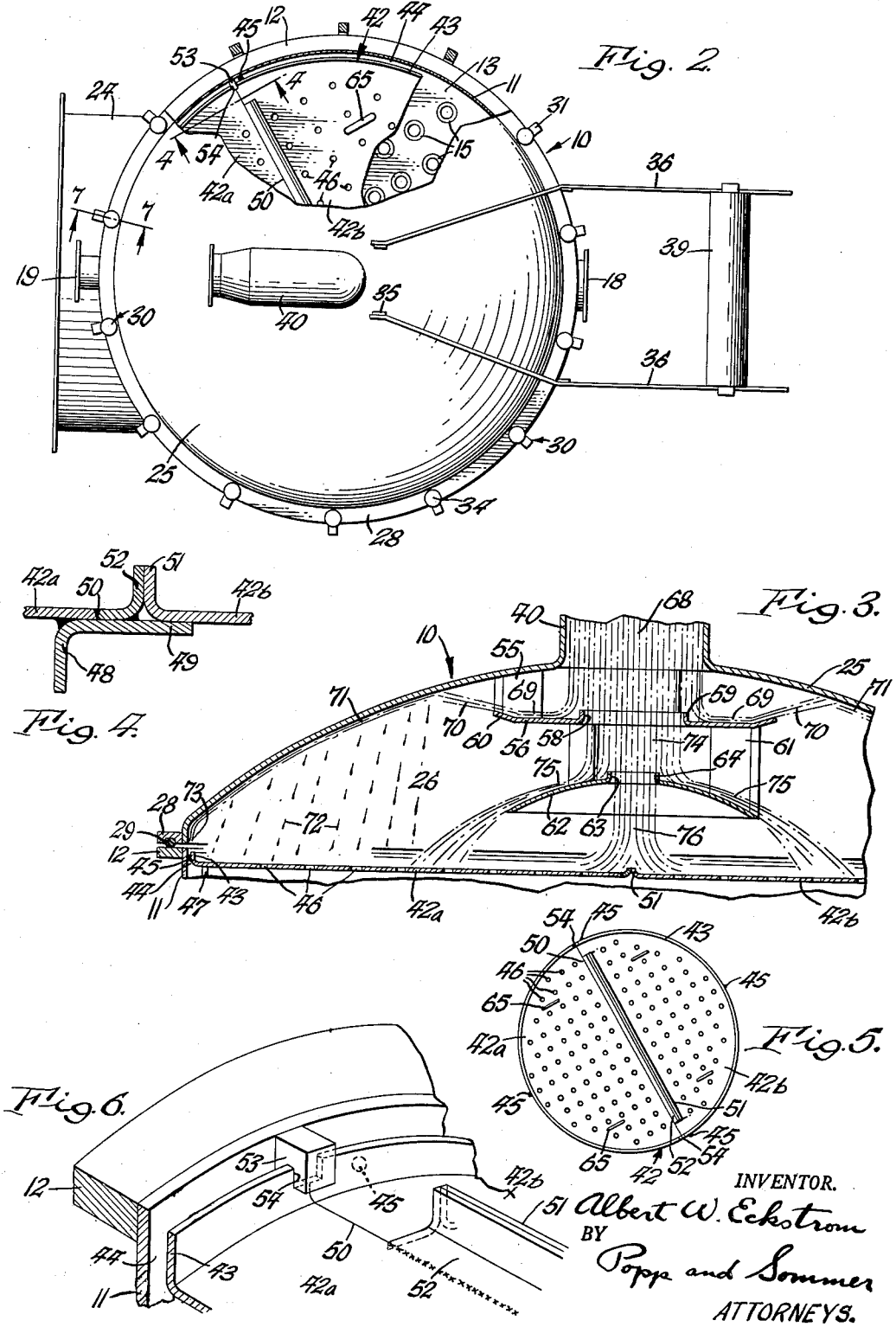

2,713,895

APPARATUS FOR SUPPLYING AND DISTRIBUTING LIQUIDS

Albert W. Eckstrom, Buffalo, N. Y., assignor to Blaw-Knox Company, Pittsburgh, Pa., a corporation of Delaware Application May 31, 1951, Serial No. 229,006

2 Claims. (Cl. 159—43)

This invention relates to apparatus for supplying and distributing liquids. It particularly relates to apparatus for supplying and distributing liquids in liquid treatment apparatus and is shown in conjunction with a downflow evaporator.

This application is a continuation in part of my co-pending application, Serial No. 102,594, filed July 1, 1949, now Patent 2,583,364, for Apparatus for Supplying and Distributing Liquids.

It is an object of the present invention to provide liquid supply and distribution apparatus by which liquids may be discharged into the upper enclosed chamber of a liquid treatment apparatus over a large area and with a minimum of splashing and to maintain an adequate head for adequate distribution.

It is a further object of the invention to provide apparatus for distributing an adequate volume of liquid to the top of each of a plurality of vertical tubes such as are used in downflow evaporators, stripping columns, and the like or to the top of packed towers such as are used in absorption or distillation processes.

Another object of the invention is to provide such apparatus for the upper domed chamber of a downflow evaporator or the like which additionally serves to prevent incrustation of the dome with a cake of the material being handled.

Another object is to provide such apparatus which is self-cleaning and also can readily be removed from the liquid treating apparatus and which also is self-locating and self-centering with reference to the treating apparatus so as to always be properly positioned for maximum efficiency in operation.

Other objects of the invention are to provide liquid supplying and distributing apparatus which is easily assembled, is non-clogging and can readily be cleaned and maintained.

Still other objects of the invention will be apparent from the description hereinafter given. For purposes of illustration, the invention will be shown and described as applied to a downflow evaporator.

In the accompanying drawings:

Fig. 1 is a vertical central sectional view through a downflow evaporator equipped with the liquid distribution apparatus embodying the present invention.

Fig. 2 is a top plan view thereof with parts broken away.

Fig. 3 is a fragmentary enlarged view similar to the upper part of Fig. 1 and illustrating the manner in which liquid distribution takes place in the distributing chamber.

Fig. 4 is an enlarged fragmentary vertical section taken on line 4—4 Fig. 2.

Fig. 5 is a top plan view, on a reduced scale, of the perforated bottom plate or distributing basket removed from the evaporator.

Fig. 6 is a fragmentary enlarged perspective view of the two halves of this perforated bottom plate or basket, viewed from the inside thereof at one end of the line of juncture.

Fig. 7 is an enlarged fragmentary vertical sectional view taken on line 7—7 Fig. 2.

The invention is shown as embodied in a downflow evaporator, indicated generally at 10, and which has an upright cylindrical shell 11 with an outwardly extending flange 12 at its upper end. Upper and lower tube sheets 13 and 14 are welded to the interior of the shell at its upper end and central portion, respectively, and these tube sheets are connected by vertical downflow evaporator tubes 15. Steam is introduced into the space or steam chest 16 around these tubes from a steam inlet 18 and the condensate is removed from this space through a condensate outlet 19.

The liquid concentrated on flowing down the tubes 15 is collected in a collecting chamber 20 at the base of the shell 11, the bottom of this collecting chamber being formed by a downwardly dished head 21 and the concentrated liquid being removed through an outlet nozzle 22 in this lower end head. The vapor generated is removed from the separating chamber 20 through a vapor outlet nozzle 24 in the side wall of this chamber.

A dome or upper cover 25 encloses a distribution chamber 26 within the shell 11 above the upper tube sheet 13 this latter forming the surface over which the liquid is to be distributed. For ready access it is important that this dome or cover 25 be readily removable and for this purpose it is shown as provided with an outwardly projecting marginal flange 28 mating with the upper flange 12 of the shell 11, a gasket 29 being interposed therebetween. At spaced intervals around these flanges 12 and 28 swinging clamping screws, indicated generally at 30 are provided. As best shown in Fig. 7, each of these swinging clamping screws is shown as comprising an L-shaped body 31 pivoted to the flange 12 at 32 so that one leg 33 of this L-shaped body swings over the flange 28 of the dome or cover. This leg 33 is provided with a threaded bore receiving a manual clamping screw 34, this screw being vertically disposed when the leg 33 is positioned over the flange 28. It will therefore be seen that by swinging the several bodies 30 to the position shown in Fig. 7 and screwing down the screw 34 the flange 28 of the dome or cover is firmly clamped to the flange 12 of the tubular shell 11 and that the gasket 29 effects a reliable seal between these flanges.

To further facilitate opening of the dome or cover 25 the dome or cover is provided near its center with a pair of upstanding ears 35 to each of which is pivoted one of a pair of counterweighted arms 36. Each of these arms is fulcrumed on an ear 38 secured to the flange 12 of the shell 11 at one side thereof and these arms extend beyond the shell and jointly carry a counterweight 39.

The liquid to be concentrated is fed downwardly from the center of the dome 25 and for this purpose a discharge pipe in the form of an inlet elbow 40 is shown as having a downturned end connected centrally with the dome or cover 25 and discharging downwardly into the center of the chamber 26.

The present invention is directed to apparatus for distributing the large volume of liquid admitted from the discharge pipe or inlet elbow 40 of the dome in adequate quantity over the surface of the upper tube sheet 13 so that an adequate quantity of liquid is supplied to each of the downflow tubes 15. Features of the invention are that this distributing apparatus is self-centering with reference to the chamber 26; is readily accessible and easily cleaned; insures an adequate quantity of liquid delivered to each of the several tubes 15; and acts to prevent dried material from building up as a cake on the underside of the dome 25.

To this end the distributing apparatus is shown as including a perforated horizontal circular bottom plate or basket 42 which is made of two halves 42a and 42b which are fitted together to form the complete bottom plate or basket. As a whole, this plate or basket is preferably provided with an upturned marginal flange 43 which is spaced as indicated at 44 from the inside of the shell 11 by a plurality of weld deposits or protuberances 45 which are applied to the flange or rim 43 of the basket so as to project radially outwardly therefrom and insure uniformity in the annular space 44 between the rim 43 of the basket and the inside of the shell 11. Also as a whole, the bottom of the basket 42 is provided with a plurality of uniformly spaced perforations 46, these perforations preferably being located out of register with the downflow evaporator tubes 15. Each of the sections 42a, 42b is also centrally provided near its semicircular margin with a leg 47 which can be welded to the underside of the basket section and which rests upon the upper tube sheet 13. The basket section 42a is also provided at each end of its line of division with the other section 42b with an L-shaped leg 48, the horizontal upper part 49 of which extends across the line of division of the two basket sections and the vertical depending part of which rests upon the tube sheet 13.

The bottom plate or basket 42 is preferably made in one piece and then is cut in half along the central line indicated generally at 50. To provide an adequate interfit between the two basket sections 42a, and 42b, the central part of the cut edge of the basket section 42b is bent upwardly to provide an upstanding flange 51, and a bar 52 which is L-shaped in cross section is welded to the corresponding cut edge of the section 42a so as to mate with or fit against the upturned flange 51 of the section 42b as best illustrated in Figs. 4 and 6.

As previously indicated, it is desirable that the perforations 46 of the basket 42 be out of register with the downflow tubes 15 and to insure such out-of-registry relation a pair of lugs 53 are welded to the inside of the shell 11, as best shown in Fig. 6, preferably in diametrically opposite relation. These lugs are received in notches 54 provided in the rim of both of the basket sections 42a, 42b along and at the ends of the line of juncture 50 thereof as best illustrated in Fig. 6.

Desirably a head of the liquid to be concentrated is maintained on the upper surface of the perforated distributing bottom plate or basket 42 and it is also desirable that the liquid forming this head be supplied in such manner as to reduce splashing and to maintain the under surface of the dome 25 free from incrustations of material drying thereon. To this end a plurality of radially disposed hangers 55 are shown as welded to the under side of the dome 25 around and adjacent the discharge pipe 40 in concentric, uniformly spaced relation thereto. An upper distributing plate or baffle 56 is welded to the lower edges of these hangers 55. This upper distributing plate or baffle 56 is of circular form and arranged concentric with discharge pipe 40 and at its center is provided with an enlarged central opening 58 surrounded by an upturned neck or flange 59. The upper distributing plate or baffle 56 is preferably of generally flat horizontal form but its marginal portion 60 is upturned so as to direct liquid flowing radially outwardly along its upper surface upwardly so as to strike the under surface of the dome 25.

A plurality of radially disposed vertical hangers 61 are welded to the under surface of the upper distributing plate or baffle 56 in uniformly spaced annular relation. To the lower edges of this second series of hangers 61 is welded a second or lower distributing plate or baffle 62. This second or lower distributing plate or baffle 62 is disposed in a horizontal plane and is preferably of circular upwardly dished form so as to be in the form of a section of a sphere. At its center this lower distributing plate is provided with an opening 63 which is of substantially smaller diameter than the opening 58 of the upper distributing plate or baffle 56 and is provided with an upstanding marginal flange or rim 64.

To facilitate removal of each section 42a, 42b of the basket each section is preferably provided with a pair of upstanding handles 65 which can be welded or secured thereto in any suitable manner.

In the operation of the liquid distributing apparatus as above described, the liquid to be concentrated is introduced into the distribution chamber 26 downwardly through the discharge pipe or elbow 40 at the center of the dome 25. This liquid discharged downwardly from the pipe 40, and designated at 68, immediately strikes the upper baffle or distributing plate 56. A portion of the liquid striking this upper distributing plate or baffle 56 is directed radially outwardly, as designated at 69, along the flat body portion of this distributing plate or baffle and strikes the upturned outer edge 60 thereof. This upturned outer edge 60 serves to deflect this portion of the liquid slightly upwardly but in a generally horizontal direction. A feature of the invention resides in this liquid leaving the upturned edge 60 in the form of a generally horizontal solid or unbroken annular curtain, designated at 70, between the upper baffle or distributing plate 56 and the under side of the dome 25. It will therefore be seen that a very substantial part of the under surface of the dome 25 at its center is prevented from having the material being handled dried thereon by virtue of the sealing off of this area by the unbroken annular curtain 70 of liquid leaving the upturned rim or flange 60 of the upper distributing plate 56.

The curtain 70 of liquid so leaving the upper baffle or distributing plate 56 in a radial direction and impinging against the under side of the dome 25 continues to move in a radial direction along the underside of this dome as indicated at 71, portions of this liquid falling from the underside of the cover or dome 25 in the form of drops 72. This dropping of the liquid in the form of drops 72 from the cover or dome continues substantially all the way to the outer extremity of the under surface of the dome so that a generally uniform distribution of this liquid over the outer area of the perforated bottom plate distributing basket 42 takes place. Because of the small size of these drops 72 they cause a relatively slight amount of turbulence in the slight head of liquid maintained within the perforated basket 42.

The liquid 71 so traveling along the under side of the cover or dome 25 and which does not fall as drops 72 from this surface into the basket 42 continues to flow down the inner surface of the rim of the cover or dome 25 and passes, as indicated at 73 along the inner surface of the shell 11 and through the small space 44 between the rim 43 of the basket 42 and the interior of the shell 11, this space being insured by the projecting weldments 45 on the rim 43 of the basket 42. This liquid 73 passes downwardly to the rim of the upper tube sheet 13 and thence flows radially inwardly on this tube sheet to insure an adequate supply of liquid to the outermost rows of tubes 15.

A portion of the liquid entering from the discharge pipe 40 passes through the central opening 58 in the upper distributing plate or baffle 56, as indicated at 74. A fraction of this portion strikes the upper surface of the upwardly dished distributing plate or baffle 62. On so striking this lower distributing plate or baffle 62, this fraction, indicated at 75, of the liquid is directed radially outwardly for distribution to the intermediate part of the perforated plate or basket 42 so as to insure an adequate supply of the liquid to be concentrated to the tubes 15 under this intermediate part of the basket 42.

Another fraction of the liquid passing through the central opening 58 of the upper distributing plate or baffle 56 passes through the opening 63 in the lower distributing plate or baffle 62, as indicated at 76. This fraction strikes the central part of the bottom plate or basket 42 and thence flows radially outwardly in this basket so as to insure an adequate supply of the liquid to the tubes 15 arranged under the lower distributing plate 62.

The purpose of maintaining a head of liquid in the bottom plate or basket 42 is to make sure that enough liquid is fed to each tube 15 to flood it properly and over its entire internal area. This requires a large volume of liquid supplied and the basket 42 serves to smooth out the flow of the liquid, reduce its turbulence and provide a more or less uniform flow through its perforations 46. The streams of liquid flowing from these perforations 46 strike the top of the upper tube sheet 13 where it is distributed further to the individual tubes 15.

In flowing down these tubes 15, the liquid is subjected to heat supplied by the steam surrounding these tubes so as to evaporate moisture and concentrate the liquid. Both the concentrated liquid and the vapor generated as a result of this evaporation flow down the tubes 15 into the separating chamber 20. In this separating chamber the concentrated liquid and the vapor separate, the concentrated liquid leaving through the outlet nozzle 22 at the bottom of this chamber and the vapor leaving through the outlet nozzle 24 at the side of this chamber.

For the purpose of cleaning the distributing apparatus forming the subject of this invention it is readily removable from the distributing chamber 26. Thus, to remove the distributing apparatus the operator unscrews the several clamping screws 24, as shown in Fig. 7, and swings the L-shaped bodies 31 of these swinging screws outwardly so as to leave the rim 28 of the dome 25 unattached to the upper rim 12 of the tubular body 11 of the evaporator. The operator also disconnects the inlet elbow 40 from the supply line, following which the cover or dome 25 can be readily lifted, this lifting being assisted by the counterweighted arms 36 which are pivoted to the center of the cover or dome and also to the upper flange 12 of the tubular body 11. This lifting of the dome or cover 25 automatically removes the upper and lower distributing plates 56 and 62 from the distributing chamber 26 since these plates are attached to the under side of this dome or cover 25.

The operator then grasps the pair of handles 65 of the half section 42b of the perforated bottom plate or basket 42 and lifts this section out of the distributing chamber 26. He then grasps the handle 65 of the other half section 42a of the distributing plate or basket 42 and lifts this section out of the distributing chamber 26.

After the distributing apparatus has been cleaned, together with the interior of the evaporator generally, the parts are reassembled in reverse order and in such reassembly it will be noted that all parts of the distributing apparatus are automatically brought into centered relation to the evaporator. It will further be noted that in such reassembly the space 44 is also automatically provided between the rim 43 of the basket 42 and the interior of the shell 11. It will also be noted that in such reassembly the perforations 46 of the bottom plate or basket 42 are automatically brought to a position out of register with the tubes 15.

Thus, in replacing the section 42a, it is placed so that its end notches 54 engage the sides of the corresponding pair of lugs 53 which are welded to the inner surface of the tubular body 11 of the evaporator. It will be noted that in so replacing this section 42a its three legs 47, 47 and 48 are placed upon the upper tube sheet 13 so as to automatically provide the proper spacing of this section of the basket above this tube sheet and also to insure that this section of the basket is in a generally horizontal position. It will also be noted that in so replacing this section 42a of the basket against the lugs 53, the weld protuberance 45 on its marginal flange or rim 43 engages the inner surface of the tubular body 11 so as to provide the small space 44 between this section of the basket and the interior of the tube or shell 11.

The operator then replaces the other basket section 42b. In replacing this other basket section 42b it is brought to rest on the upper horizontal portions 49 of the legs 48, as best shown in Fig. 4, and with its upturned central flange 51 in engagement with the upturned angle 52 welded to the basket section 42a. Its end notches 54 are also brought to fit the corresponding sides of the lugs 53 welded to the interior of the tubular body 11 and its weld protuberances 45 are brought to engage the interior of the tube or shell 11.

It will therefore be seen that the two sections of the basket are brought together in such manner as to provide a joint therebetween through which little liquid will escape; that the sections are fitted together so as to provide a circular perforated basket having the upturned flange 43; this basket is supported upon the tube sheet 13 in a generally horizontal position and in proper vertically spaced relation thereto; this basket is properly centered with reference to the tubular shell 11; and this basket is so positioned as to insure the small space 44 between the rim of the basket and the interior of the shell 11.

The operator then lowers the dome or cover 25 so that its flange 28 is brought into mating relation with the flange 12 of the tubular body 11. This closing is assisted by the counterweighted arms 36 and this closing automatically centers the distributing plates or baffles 56 and 62 with reference to the evaporator and to the perforated bottom plate or basket 42.

The operator then swings up the L-shaped bodies 31 (Fig. 7) so as to extend over the flange 28 of the cover or dome and tightens the clamping screws 34 so as to insure a reliable seal between the flanges 28 and 12 by the gasket 29.

It will accordingly be seen that the present invention provides an extremely simple and effective apparatus for distributing a feed liquid to a downflow evaporator or the like which is always assured of being in proper position; which also assures an adequate supply of liquid to each of the several tubes of the evaporator; and which also serves to prevent incrustations on the under surface of the dome of the evaporator through the drying thereon of the material being handled.

I claim:

1. In liquid distributing apparatus having a distributing chamber formed by a tubular side wall, a horizontal bottom wall across the interior of said tubular side wall, and a cover removably secured to the upper rim of said tubular side wall, and said liquid distributing apparatus also having a vertical discharge pipe arranged to discharge liquid downwardly into the center of said distributing chamber and said liquid distributing apparatus also having means for conveying liquid out of the bottom of said distributing chamber; the combination therewith of means for distributing over said horizontal bottom wall the liquid discharged downwardly from said pipe into said distributing chamber, comprising a generally horizontal stationary bottom plate occupying substantially the full horizontal area of said chamber and having a series of uniformly spaced perforations therethrough and arranged above and in closely spaced juxtaposition to said surface, spaced protuberances projecting radially from the perimeter of said bottom plate and holding said perimeter in closely spaced relation to the interior of said tubular side wall, and means arranged to distribute a portion of the liquid from said discharge pipe to the upper face of said bottom plate and another portion radially along the under side of said cover and then down through the space between the perimeter of said bottom plate and said tubular side wall to the marginal part of said surface.

2. In liquid distributing apparatus having a distributing chamber formed by a tubular side wall, a horizontal bottom wall across the interior of said tubular side wall, and a cover removably secured to the upper rim of said tubular side wall, and said liquid distributing apparatus also having a vertical discharge pipe arranged to discharge liquid downwardly into the center of said distributing chamber and said liquid distributing apparatus also having means for conveying liquid out of the bottom of said distributing chamber; the combination therewith of means for distributing over said horizontal bottom wall the liquid discharged downwardly from said pipe into said distributing chamber, comprising a pair of half sections mating to provide a generally horizontal stationary bottom plate occupying substantially the full horizontal area of said chamber and having a series of uniformly spaced perforations therethrough, legs arranged across and at opposite ends of the line of juncture of said sections and each fixed to one of said sections to support jointly said sections at said line of juncture on said surface, an additional leg fixed to each of said sections remote from said first legs and from said line of juncture to support the parts of said sections remote from said line of juncture on said surface, spaced protuberances projecting radially from the perimeter of said bottom plate and holding said perimeter in closely spaced relation to the interior of said tubular side wall, and means arranged to distribute a portion of the liquid from said discharge pipe to the upper face of said bottom plate and another portion radially along the under side of said cover and then down through the space between the perimeter of said bottom plate and said tubular side wall to the marginal part of said surface.

References Cited in the file of this patent

UNITED STATES PATENTS

| Number | Name | Date |
|---|---|---|
| 228,542 | Lister | June 8, 1880 |
| 466,862 | Lillie | Jan. 12, 1892 |
| 470,060 | Lillie | Mar. 1, 1892 |
| 484,831 | Stillman | Oct. 25, 1892 |
| 491,659 | Lillie | Feb. 14, 1893 |
| 1,449,313 | Bollmann | Mar. 20, 1923 |
| 1,931,689 | Evans | Oct. 24, 1933 |
| 2,005,600 | Tappen | June 18, 1935 |
| 2,375,528 | De Flon | May 8, 1945 |
| 2,512,938 | Hengey | June 27, 1950 |
| 2,583,364 | Eckstrom | Jan. 22, 1952 |

FOREIGN PATENTS

| Number | Country | Date |
|---|---|---|
| 22,408 | Great Britain | Oct. 10, 1907 |
| 103,488 | Great Britain | Jan. 15, 1917 |